United States Patent
Rolia

(10) Patent No.: US 7,266,598 B2
(45) Date of Patent: Sep. 4, 2007

(54) PROGRAMMABLE DATA CENTER

(75) Inventor: Jerome Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 10/278,508

(22) Filed: Oct. 22, 2002

(65) Prior Publication Data

US 2004/0078458 A1    Apr. 22, 2004

(51) Int. Cl.
*G06F 15/00* (2006.01)
*G06F 15/16* (2006.01)

(52) U.S. Cl. ............ 709/223; 709/217; 709/219; 358/1.15; 358/400

(58) Field of Classification Search ........ 709/221–225; 370/395, 465, 216; 359/135; 725/143, 149; 398/1–7, 49
See application file for complete search history.

(56) References Cited

U.S. PATENT DOCUMENTS

| | | | | |
|---|---|---|---|---|
| 6,069,892 A | * | 5/2000 | Tochio | 370/395.5 |
| 6,151,431 A | * | 11/2000 | White | 385/21 |
| 6,438,753 B1 | * | 8/2002 | Fegesch et al. | 725/143 |
| 6,643,586 B2 | * | 11/2003 | Allen et al. | 701/213 |
| 6,940,810 B1 | * | 9/2005 | Roa-Diaz | 370/217 |
| 7,035,537 B2 | * | 4/2006 | Wang et al. | 398/7 |

* cited by examiner

*Primary Examiner*—David Wiley
*Assistant Examiner*—Jude J Jean-Gilles

(57) ABSTRACT

Techniques are disclosed for providing a programmable data center, which includes a plurality of computers, a plurality of computing devices or resources, a programmable service fabric, and an operation controller. The computers act as computing hosts; the resources are associated with computing service providers; the programmable service fabric implements "virtual wires" represented by wavelengths to connect the hosts to the resources; and the operation controller manages operations of the data center. As customers desire a computing system for their applications, the customers provide their computing requirements identifying the number of hosts, the number of resources, etc., from which the operation controller creates a customized system from the utility data center. The operation controller, based on the provided requirements, selects the appropriate hosts, resources, and available wavelengths that implement the virtual wires, etc. The operation controller also programs the components of the programmable service fabric to convert the electrical signal to light waves, to create the light path for the light waves to travel to from the hosts to appropriate destinations, to reconvert the light waves to the electrical signals, to map these signals to the resources, etc. Embodiments of the invention including the virtual wire technologies provide both performance and security isolations between systems customized for individual customers.

27 Claims, 6 Drawing Sheets

PROGRAMMABLE DATA CENTER

FIELD OF THE INVENTION

The present invention relates generally to computing systems and, more specifically, to a programmable data center.

BACKGROUND OF THE INVENTION

In computing systems, computers and other resources may not reside at the same or neighboring physical locations. Some computers, e.g., hosting servers, may be at one location while the resources, such as the storage arrays, may be at various other locations remote from the hosts. Transferring data in these systems commonly uses the Ethernet and/or Fiber channel switches, which switch or route the data. However, Ethernet switches, like many other connection fabrics, use physical wires with associated technology-specific protocols, and a protocol is normally designed for a particular fabric, but does not work with another fabric. As a result, a fabric supports only one protocol. For example, an Ethernet fabric uses the Ethernet protocol to process Ethernet packets, a Fiber channel fabric uses the Fiber channel protocol to process Fiber channel packets, an Infiniband fabric uses the Infiniband protocol to process Infiniband packets, etc.

Current utility data centers typically include more than one type of fabric in which various systems customized for various customers may share the same fabric for the same technology, e.g., Ethernet fabric for Ethernet packets, Fiber channel for Fiber packets, etc. Unfortunately, systems sharing the same fabric may be able to interfere with operations of one another.

For almost all fabrics, when the number of resources increases, particularly in large-scale systems, transferring data between the resources is more complicated, and a fabric may encounter its limitation. This is because the high data volumes usually require complicated networking infrastructure, including hierarchical trees and/or meshes. In many cases, a simple bottleneck within a fabric may slow the whole system. For example, in a hierarchical tree, data from one side of the tree must traverse to the top node before arriving at its destination on the other side. A bottleneck at the top node thus can slow the data movements between the two sides and/or limit the ability to relocate resources from one side to another side. As the number of resources increases, the number of wires or cables connecting the resources also increases. Further, large-scale systems in data centers also tend to use expensive storage arrays to implement securities, to provide programmability features, virtual disk arrangements, etc. These storage arrays and their corresponding fabrics must support very high bandwidths to reduce performance interactions between systems.

Based on the foregoing, it is desirable that mechanisms be provided to solve the above deficiencies and related problems.

SUMMARY OF THE INVENTION

The present invention relates to techniques for providing a programmable data center, which, in one embodiment, includes a plurality of computers, a plurality of computing devices or resources, a programmable service fabric, and an operation controller. The computers act as computing hosts; the resources are associated with computing service providers; the programmable service fabric implements "virtual wires" represented by wavelengths to connect the hosts to the resources; and the operation controller manages operations of the data center.

The programmable service fabric in turn includes a plurality of programmable transponders of two different types, a plurality of multiplexers, a programmable optical switching fabric, and a plurality of de-multiplexers. A transponder of the first type converts electrical signals representing host services to light waves represented by tunable wavelengths. A multiplexer combines multiple light waves into one fiber. The switching fabric routes the combined light waves to the appropriate de-multiplexer, which de-aggregates the combined light waves to separate light waves. A transponder of the second type re-converts the separate light waves to electrical signals and maps these signals to appropriate ports or interfaces connected to the resources.

As customers desire a computing system for their applications, the customers provide their computing requirements identifying the number of hosts, the number of resources, etc., from which the operation controller creates a customized system from the data center. The operation controller, based on the provided requirements, selects the appropriate hosts, resources, and available wavelengths that implement the virtual wires, etc. The operation controller also programs the components of the programmable service fabric to convert the electrical signals to light waves, to create the light path for the light waves to travel to and from the hosts to appropriate destinations, to reconvert the light waves to the electrical signals, to map these signals to the resources, etc. Embodiments of the invention including the virtual wire technologies provide both performance and security isolations between systems customized for individual customers.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1A:
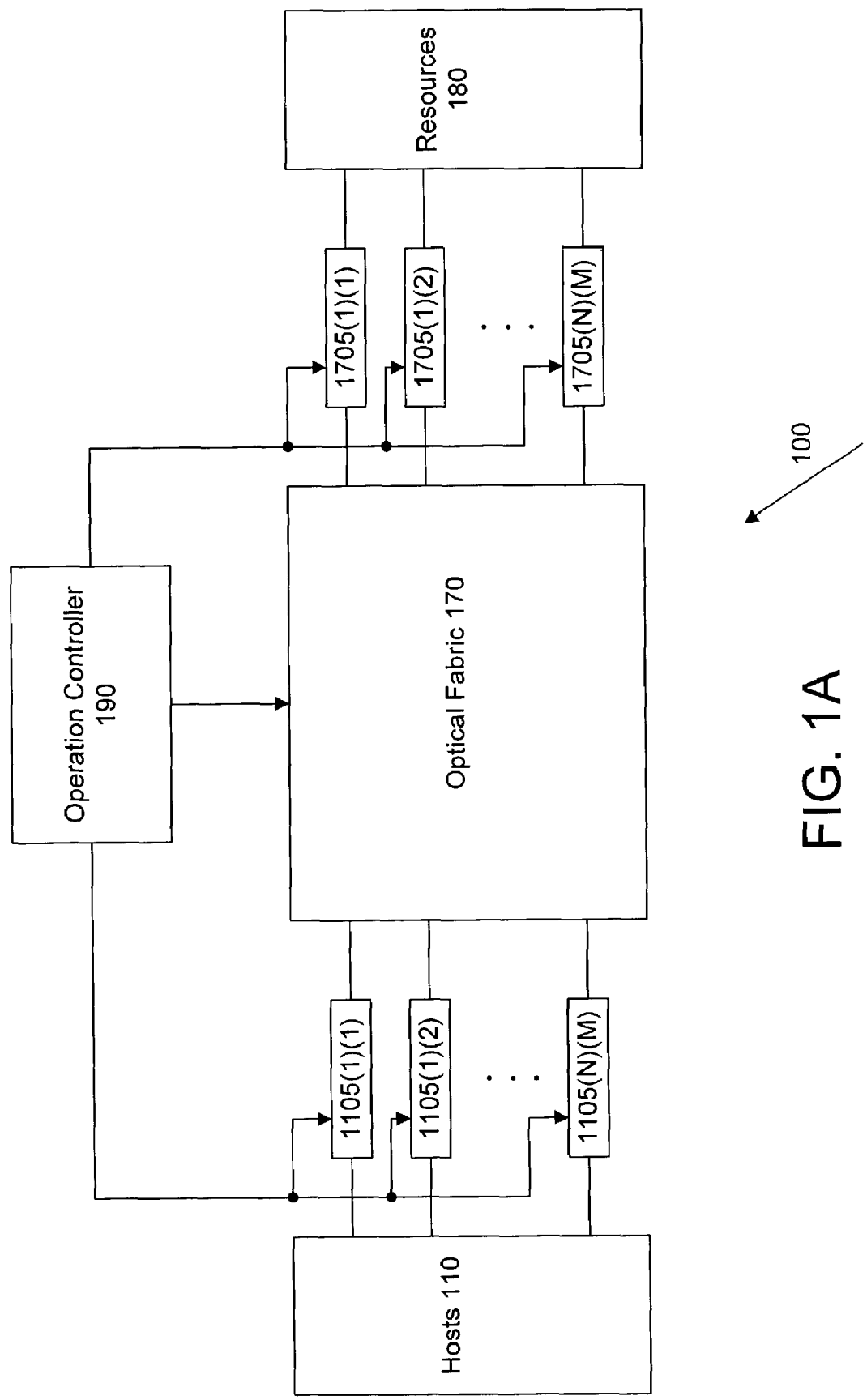
FIG. 1A shows a data center upon which embodiments of the invention may be implemented.

FIG. 1A shows a utility data center (UDC) 100 upon which embodiments of the invention may be implemented. UDC 100 includes a plurality of hosts 110, a plurality interfaces or ports 1105 for hosts 110, a programmable fabric 170, a plurality of interfaces or ports 1705 for resources 180, a plurality of computing resources 180, and an operation controller 190. Hosts 110 and resources 180 can be at different locations, and one may be remote from another one. UDC 100 may be used to implement a utility data center comparable to that provided by, e.g., Hewlett-Packard Company of Palo Alto, Calif. Interfaces 1105 and 1705, depending on implementations may be divided into groups of sets, and each interface is therefore identified by two indices, e.g., an interface 1105(1)(1), an interface 1105(1)(2), and interface 1105(N)(M), etc.

The Hosts

A host 110 is a computer, which, in general, provides processing power for computer services. A host 110 may be referred to as a node, a server, etc. A host 110, usually via interface cards, is connected to one or a plurality of data interfaces or ports 1105, each of which can adapt to a different technology or communication protocol for carrying data, such as the Ethernet, the Fiber channel, the Infiniband, the serial cables, etc. FIG. 1A shows that interfaces 1105 are separate from host 110 and optical fabric 170. However, interfaces 1105 can be part of optical fabric 170 and/or a host 110. Similarly, interfaces 1705, shown as separate from fabric 170, may be part of fabric 170.

Generally, signals appearing at interfaces 1105 are in the form of electrical signals, and fabric 170 converts these signals to light waves, routes these light waves to appropriate destinations, and re-converts the light waves to electrical signals to appear at interfaces or ports 1705. Resources 180 connected to interfaces 1705 are generally computing resources, including, for example, the Ethernet or Fiber channel switches, routers, storage arrays, etc.

The Operation Controller

Operation controller 190 manages operations of UDC 100, and, in one embodiment is implemented in software. However, operation controller 190 may be implemented in various ways such as firmware, hardware or circuitry, a combination of hardware and firmware, etc. Operation controller 190 may reside at any convenient location including, for example, a host 110, a dedicated server, etc. Operation controller 190, based on requirements provided by customers, can create a system customized for the customers. Operation controller 190 selects appropriate hosts 110, resources 180, and available wavelengths in fabric 170 that represent virtual wires to connect selected hosts 110 and resources 180. Operation controller 190 creates the light paths for data to be transferred between hosts 110 and resources 180, through appropriate components of UDC 100 and of fabric 170. For example, operation controller 190, via control interfaces of the components of fabric 170, programs appropriate transponders to convert electrical signals to and from light waves, programs the switching fabric to route data from an input port to appropriate output ports, to command a multiplexer or de-multiplexer to aggregate or de-aggregate appropriate wavelengths, etc.

The Programmable Fabric

Figure 1B:
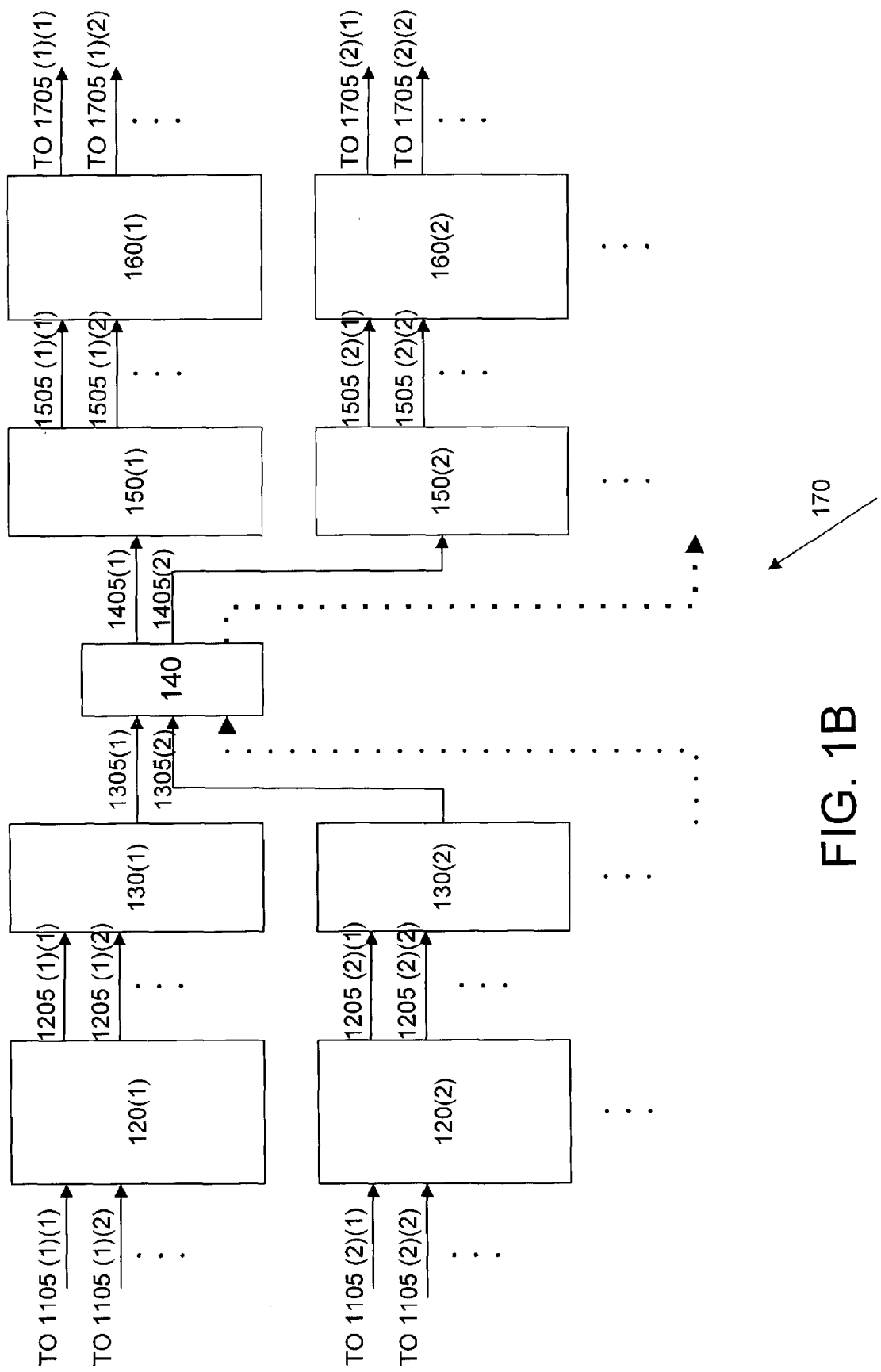
FIG. 1B shows an embodiment of the programmable service fabric of the system in FIG. 1A.

FIG. 1B shows an embodiment of programmable fabric 170 that includes a plurality of first-type transponders 120, a plurality of multiplexer 130, a switching fabric 140, a plurality of de-multiplexers 150, and a plurality of second-type transponders 160. Each set of a multiplexer 130 and a transponder 120 is associated with a set of interfaces 1105, and each set of a de-multiplexer 150 and a transponder 160 is associated with a set of interfaces 1705.

The Programmable Control Interfaces

In one embodiment, components of UDC 100, e.g., interfaces 1105 and 1705, transponders 120 and 160, multiplexers 130, switching fabric 140, and de-multiplexers 160, etc., are programmable, and are controllable by operation controller 190. In general, each of these components includes a programmable control interface (not shown) for receiving inputs from operation controller 190, and, based on the provided inputs and individual component operation, provides the desired outputs. Depending on the manufacturers and the type of individual components, the control interface of each component varies and is subject to a particular operation specification. Operation controller 190, based on each specification and via the corresponding control interface, provides inputs to program the corresponding component, and thus achieve the desired results. Operation controller 190 may also use a protocol such as the Simple Network Management Protocol (SNMP) to effect the components' behavior. For example, operation controller 190 may use the SET command from the SNMP protocol to modify a switching table in switching fabric 140, and thus cause the desired switching results.

The First-Type Transponder

A first-type transponder 120 converts electrical signals on a set of interfaces 1105 to light waves represented by wavelengths on lines 1205. These electrical signals are manifestations of communication or service protocols such as the Ethernet, the Fiber channel, the Infiniband, etc. In one embodiment, inputs of a transponder 120 receive a particular protocol, e.g., the Ethernet, the Fiber channel, and, therefore, a host 110 having multiple protocols may require a set of transponders 120, one for a particular protocol. However, in the example shown in FIG. 1B that inputs of a transponder 120 may receive multiple protocols, a host 110 may be associated with only one transponder 120. Operation controller 190, via the control interface of a transponder 120, programs a transponder 120 to assign a wavelength to a service or to reclaim a wavelength that is no longer used, for later use. Typically, because a transponder 120 provides many wavelengths to be selected for a service signal, the wavelengths may be referred to as tunable. In one embodiment, via the tuple (electrical signal S, wavelength W), operation controller 190 commands a transponder 120 to map signal S of the desired protocol/service from an interface 1105 onto a specific light wave represented by a wavelength W. Transponder 120 can process light waves that support different data transfer rates such as 10 Gbits/second, 20 Gbits/second, 40 Gbits/second, etc. In one embodiment, a transponder 120 is manufactured by Cisco Systems of San Jose, Calif., such as the Cisco ONS 15540 ESP. Alternatively, a transponder 120 may be manufactured by Nortel Networks Corp. of Canada or of other manufacturers.

The Multiplexer

A multiplexer 130 receives a plurality of light waves on lines 1205 as inputs, combines them into a single fiber, and outputs it on a line 1305. In one embodiment, operation controller 190 uses the tuple, e.g., (input ports 1, wavelengths W, output port O) to command a multiplexer 130 to aggregate light waves represented by wavelengths W on the input ports I to the specified output port O. Because the light waves at inputs 1205 may be from different technologies and/or services, the fiber on line 1305 in effect transports data from different technologies and/or services. Further, because the fiber on lines 1305 processes wavelengths without regard to the technology at interfaces 1105, fabric 170 may be referred to as service or technology transparent, and the fiber on lines 1305 can support new services or technologies as long as they can be converted to light waves. Additionally, because the light waves on fibers 1305 effectively operate independently of one another even within the same fiber, these light waves do not interfere with one another, and thus provide security and performance isolations. Having only one output on a line 1305, which becomes an input of switching fabric 140, reduces the number of physical cables that would be used as inputs for switching fabric 140 and simplifies the tasks of switching fabric 140. In one embodiment, a multiplexer 130 is implemented using one of the GigaMux Metro DWDM Transport Systems by Sorrento Networks of San Diego, Calif. In this embodiment, a multiplexer 130 can multiplex up to 64 input wavelengths onto a fiber.

The Optical Switching Fabric

Switching fabric 140 includes a plurality of input ports on lines 1305 and a plurality of output ports on lines 1405. As shown in FIG. 1B, an input port corresponds to a multiplexer 130, a transponder 120, and a set of interfaces 1105. Similarly, an output port corresponds to a de-multiplexer 150, a transponder 160, and a set of interfaces 1705. However, in various embodiments, a transponder 120 or a transponder 160 may be replaced by a set of transponders 120 or a set of transponder 160, respectively. Switching fabric 140 receives wavelengths at the input ports and "switches" or "routes" the wavelengths to the output ports on lines 1405 to be sent to the corresponding de-multiplexers 150. In one embodiment, switching fabric 140 maintains a switching table for switching a particular wavelength to a particular output port. For example, switching fabric 140, based on the switching table, routes a wavelength W1 to a predetermined output port O1, a wavelength W2 to a predetermined output port O2, a wavelength W3 to a predetermined output port O3, etc. These wavelengths may or may not be from the same input port I. Alternatively, operation controller 190 uses the tuple, e.g., (wavelength W, input port I, output port O) to program wavelength W to be switched from input port I to output port O. Other effective switching approaches for routing wavelengths are within the scope of the invention.

FIG. 1B shows only one switching fabric 140 as an example. In various situations, switching fabric 140 may send data to one or more additional switching/routing fabric comparable to switching fabric 140 before the data reaches a de-multiplexer 150. Alternatively, switching fabric 140 may include more than one switching layer in which a switching layer routes data to another layer, and the data is routed from an input port through the layers to the appropriate output port. Layers of switches increase the number of hosting servers and other resources such as switches, routers, and storage systems to be included in UDC 100. Technologies used in switching fabric 140 vary, including, for example, reflecting mirrors, which are used to reflect the desired light wave from the input port to the appropriate output port. In one embodiment, switching fabric 140 is implemented using the Sorrento Networks' TeraMatrix wavelength switching platform, which includes optical switches having 4 input ports and 4 output ports to 512 input ports and 512 output ports for fibers, and up to 64 wavelengths per fiber. Operation controller 190 can program the TeraMatrix to allocate desired wavelengths. Switching fabric 140 may be referred to as an optical switching fabric because it processes light waves.

The De-Multiplexers

A de-multiplexer 150 de-aggregates the combined light waves on a line 1405 into separate light waves on lines 1505. The combined light waves on a line 1405 may come from various locations and/or hosts 110. Operation controller 190 may use the tuple, e.g., (wavelength W, output port O) to direct wavelength W to output port O. In one embodiment, the Sorrento Networks GigaMux Metro DWDM Transport System is used to implement a de-multiplexer 150. As shown in FIG. 1B, a de-multiplexer 150 is associated with a transponder 160 and a set of interfaces 1705, which are usually at the same or neighboring vicinity or physical locations, and any signal to be destined at one of these interfaces 1705 is sent to the associated de-multiplexer 150.

The Second-Type Transponders

A transponder 160 converts light waves on lines 1505 to electrical signals and maps them to appropriate interfaces 1705. The electrical signals on interfaces 1705 correspond to the electrical signals on interfaces 1105. For example, if a packet, e.g., packet P(1) on interface 1105(1)(1) is an Ethernet packet, then after traveling through an embodiment of fabric 170, packet P(1) appears, e.g., on interface 1705(1)(1) as an Ethernet packet. Similarly, if a packet, e.g., packet P(2) on interface 1105(1)(2) is an Infiniband packet, then, after traveling through optical fabric 170, packet P(2) appears, e.g., on interface 1705(2)(1), as an Infiniband packet, etc. Depending on embodiments, outputs of a transponder 160 may provide one or more than one protocol.

The Light Paths

To send data between a host, e.g., host 110(1) and a resource, e.g., resource 180(1), a light path between host 110(1) and resource 180(1) is established. Once the light path has been established, the data can be transferred between the hosts and the resources. This light path allows the light wave to traverse through an interface 1105, a transponder 120, a line 1205, a multiplexer 130, a line 1305, switching fabric 140, a line 1405, a de-multiplexer 150, a line 1505, a transponder 160, and an interface 1705. When a system is created from UDC 100, e.g., for use by an application of a customer, operation controller 190 identifies appropriate hosts 110 and resources 180, and creates the light paths for carrying data between the identified hosts 110 and resources 180. In one embodiment, the topology information regarding hosts 110, resources 180, and their connectivity is readable by operation controller 190, and is typically included in a file. Alternatively, the information can be stored in other means also readable by operation controller 190, such as a database, a file server, etc. This information usually includes the quantity of hosts 110 and of resources 180, the type of each resource, the number and the kind of connections, etc. Operation controller 190 then regards hosts 110, transponders 120 and 160, multiplexers 130, switching fabric 140, de-multiplexers 150, and resources 180 as a logical graph, and, through this graph, determines the paths for virtual wires connecting hosts 110 and resources 180. In one embodiment, operation controller 190 uses Dijkstra's shortest-path algorithm for identifying such paths. In another embodiment, switching fabric 140 includes management software that can identify a path.

Operation controller 190 also identifies an available wavelength to assign to the corresponding electrical signal on interface 1105 for an identified path. A wavelength is available for use if it is not in conflict, e.g., not being used by other components or subsystems of UDC 100 along the path being established. Thus, a wavelength may be used more than once as long as each use is for a distinct path. Operation controller 190 also selects a wavelength that would reduce the likelihood of conflicts for wavelengths. To make available a wavelength, operation controller 190 may re-assign wavelengths between resources. For example, a system S1 can use either a wavelength W1 or W2, but a system S2 can only use wavelength W2. However, wavelength W2 is being used by system S1, and wavelength W1 is available, but cannot be used by system S2. Operation controller 190 then switches wavelength W1 to be used by system S1, and thus makes wavelength W2 available to be used by system S2.

Operation controller 190 also programs the appropriate components, e.g. transponders 120 and 160, switching fabric 140, multiplexer 130, de-multiplexer 150, etc., for each component to perform its corresponding operations. As a result, through these components, there are connectivity or "virtual wires" between hosts 110 and resources 180.

When a customer seeks to add hosts 110 and/or resources 180 to an existing system, the customer provides relevant information, e.g., the quantity of hosts 110 and/or resources, the number and kind of connections, etc. Operation controller 190 adds the necessary virtual wires as described above. Similarly, when a customer seeks to remove a host 110 and/or a resource 180, operation controller 190 identifies the affected virtual wires and programs the relevant component, e.g., optical switching fabric 140, to discontinue their corresponding use of the wavelengths, and thus free these wavelengths for future use. In general, information to add or remove a virtual wire is readable by operation controller 190, and may be stored in a file, a file server, a database, etc. To act accordingly, operation controller 190 keeps a record of the used and unused wavelengths in UDC 100. Unused wavelengths are available to allocate to new applications and/or customers. The total number of wavelength for use in UDC 100 and for a system customized for an individual customer varies depending on embodiments of optical fabric 170.

Features of the Utility Data Center

Features of UDC 100 appear in various embodiments. UDC 100 is service transparent because it, via programmable fabric 170, processes light waves withoutregard to the packet protocols that have been converted into the light wave protocol and re-converted to the packet protocols. As long as a service signal can be converted into light waves and back to the service signal, that service can use fabric 170. This is different from prior data center approaches in which a technology-specific fabric processes packets based on a protocol only associated with that fabric.

UDC 100 may be referred to as programmable because, based on the programmability of transponders 120 and 160, multiplexer 130, de-multiplexer 160, etc., an arbitrary host 110 may be connected to an arbitrary resource 180, and thus form a particular system for a particular customer. Further, a wavelength can be arbitrarily selected or programmed to correspond to a signal of an interface 1105. As a result, using different sets of wavelengths and based on the programmability of the components in fabric 170, various systems, e.g., one for a particular customer, having different configurations of hosts 110 and resources 180 may be created or "programmed" concurrently. For example, one customer may seek to have a single hosting server 110 connected to a storage array via a Fiber channel connection. Another customer may seek to have a multitude of Web, application, and database servers interconnected via Ethernet switches and routers, along with firewalls and load balancers. Servers 110 may also be interconnected with storage arrays and appliances using their corresponding protocols and fabric resources.

UDC 100 using fabric 170 may also be referred to as providing virtual wires that replace the physical wires required by other approaches to connect hosts 110 and resources. Each wavelength allows connectivity or the transferring of data between a host 110 and a resource 180, and therefore may be referred to as a virtual wire. In approaches using physical wires, as the number of hosts and/or resources increases, the number of wires increases. However, fabric 170 using light waves requires only some basic physical wires but can connect various different sets of hosts 110 and resources 180.

A group of hosts 110 designed for a system and/or a customer can be securely isolated from another group of hosts 110 designed for a different system and/or customer. This is because, in general, the wavelengths used to transfer data between hosts 110 and resources 180 in a system are independent of the wavelengths of another system. Information from one wavelength does not propagate to another wavelength, even if the two wavelengths use the same fabric on a line 1305. As a result, one wavelength cannot interfere with another wavelength. Additionally, hosts 110 have no control over the electrical signals that have been converted into light waves of different wavelengths. For example, once a transponder 120 is programmed to generate a set of wavelengths for a particular customer and/or host 110, this host 110 has no control over that transponder 120 to change that set of wavelengths. Since hosts 110 cannot change the wavelengths, hosts 110 cannot change the data associated with the wavelengths.

Because systems created from UDC 100 can operate independently and their data is free from interference from one another, system performance can increase. Further, because each system is provided with a set of wavelengths to connect its customized hosts 110 and resources 180, the connection architecture within the customized system is usually simple, and therefore also results in performance increase.

A First Exemplary Embodiment of the Utility Data Center

In this embodiment, UDC 100 includes 1024 hosts 110 and 256 resources 180. Each host 110 includes two Ethernet interfaces 1105, two fiber channel interfaces 1105, one RAM server interface 1105, and one console interface 1105, and thus for a total of six interfaces 1105. Consequently, the total number of Ethernet interfaces 1105, the total number of Fiber channel interfaces 1105, the total number of RAM server interfaces 1105, and the total number of console interfaces 1105 in UDC 100 is 2048 (=1024 hosts×2 interfaces per host), 2048 (=1024 hosts×2 interfaces per host), 1024 (=1024 hosts×1 interface per host), and 1024 (=1024 hosts×1 interface per host), respectively. Six interfaces 1105 of a host 110 corresponds to a set of transponder 120, a multiplexer 130, and a line 1305.

Switching fabric 140 includes two layers, e.g., layer one and layer two, in which each layer includes 16 switches having 64 inputs. At the input side, each switch of layer one is connected to 64 lines 1305 or 64 (=1024 hosts/16 switches) multiplexers 130 with one multiplexer per host while at the output side, four output fibers of a switch of layer one are connected to the inputs of each 16 switches of layer two. Thus switches of layer one have 64 outputs, and switches of layer two have 16 outputs that are connected to de-multiplexers 150.

For illustration purposes, the number of resources 180 connected to switching fabric 140 for 2048 Ethernet interfaces, 2048 fiber channel interfaces, 1024 RAM server interfaces, and 1024 console interfaces is 32, 16, 32, and 32, respectively. As a result, the number of interfaces 1705 is 64 (=2048 interfaces/32 switches per interface), 128 (=2048 interfaces/16 switches per interface), 32 (=1024 interfaces/32 switches per interface), and 32 (1024 interfaces/32 switches per interface), respectively. Consequently, the total number of interfaces 1705 is 256 (=64 interfaces+128 interfaces+32 interfaces+32 interfaces), which corresponds to 256 resources 180 supported by UDC 100.

A Second Exemplary Embodiment of the Utility Data Center

In this embodiment, UDC 100 includes 4096 hosts 110 and 1024 resources 180. Each host 110 includes two Ethernet interfaces 1105, two fiber channel interfaces 1105, one RAM server interface 1105, and one console interface 1105, and thus for a total of six interfaces 1105. Consequently, the total number of Ethernet interfaces 1105, the total number of Fiber channel interfaces 1105, the total number of RAM server interfaces 1105, and the total number of console interfaces 1105 in UDC 100 is 8192 (=4096 hosts×2 interfaces per host), 8192 (=4096 hosts×2 interfaces per host), 4096 (=4096 hosts×1 interface per host), and 4096 (=4096 hosts×1 interface per host), respectively. Six interfaces 1105 of a host 110 corresponds to a transponder 120, a multiplexer 130, and a line 1305.

Switching fabric 140 includes two layers, e.g., layer one and layer two, in which each layer includes 64 switches having 64 inputs. At the input side, each switch of layer one is connected to 64 lines 1305 or 64 (=4096 hosts/64 switches per host) hosts via multiplexers 130, with one multiplexer per host. At the output side, one output fiber of a switch of layer one is connected to 64 inputs of a switch of layer two. Layer-one and layer-two switches each have 64 output fibers.

For illustration purposes, the number of resources 180 connected to switching fabric 140 for 8192 Ethernet interfaces, 8192 fiber channel interfaces, 4096 RAM server interfaces, and 4096 console interfaces is 32, 16, 32, and 32, respectively. As a result, the number of interfaces 1705 is 256 (=8192 interfaces/32 switches per interface), 512 (=8192 interfaces/16 switches per interface), 128 (=4096 interfaces/32 switches per interface), and 128 (4096 interfaces/32 switches per interface), respectively. Consequently, the total number of interfaces 1705 is 1024 (256 interfaces+ 512 interfaces+128 interfaces+128 interfaces), which corresponds to 1024 resources 180 supported by UDC 100.

Illustrative Steps for Programming a Customize System of the Data Center

Figure 2A:
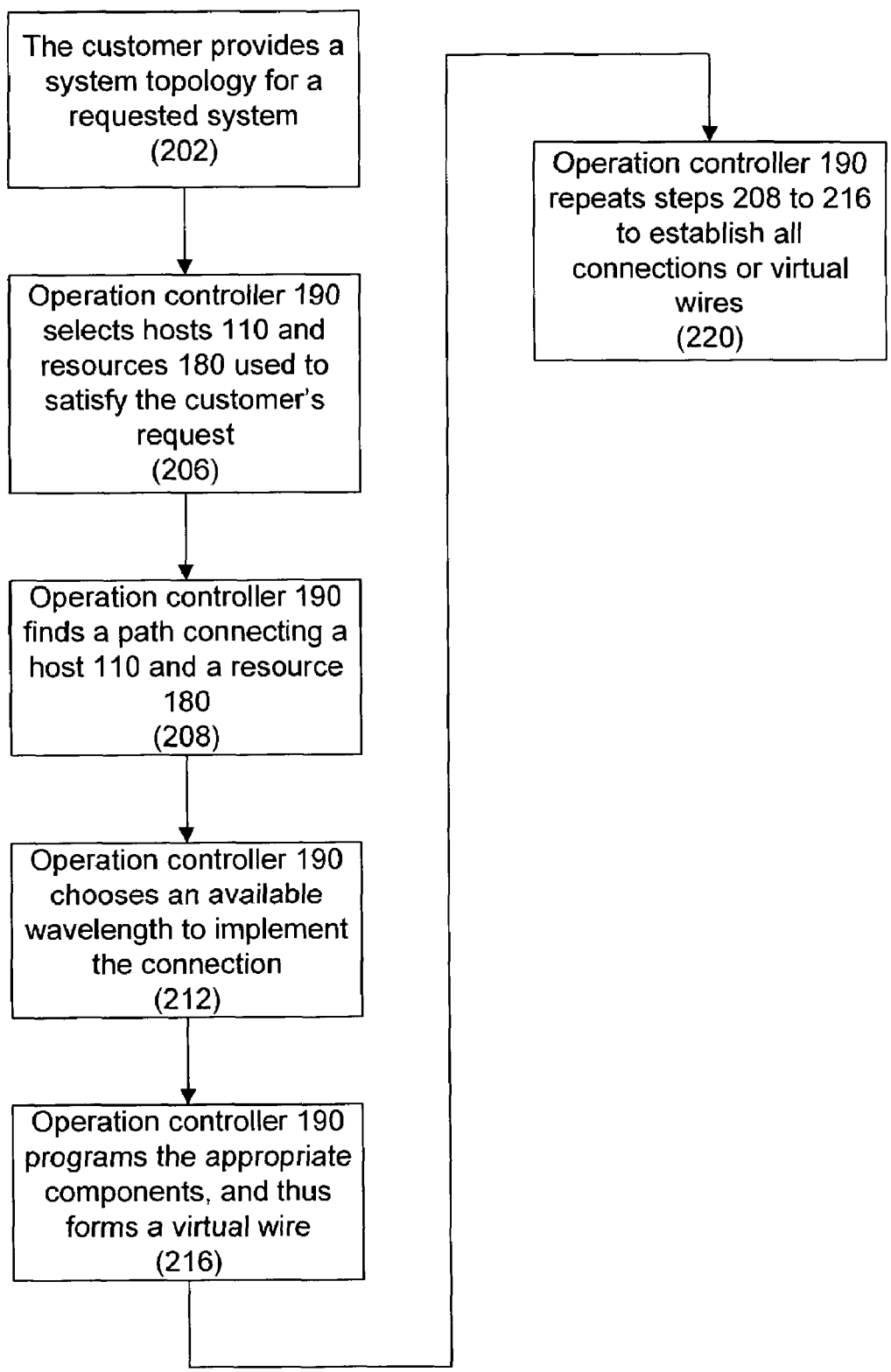
FIG. 2A is a flowchart illustrating the steps used in programming a customized system from the data center of FIG. 1A, in accordance with one embodiment.

FIG. 2A shows a flowchart illustrating the steps for programming a system customized for use by an application of a customer, in accordance with one embodiment.

In step 202, the customer provides a system topology identifying the number of hosts 110, the number of resources 180, and connectivity between those hosts and resources.

In step 206, operation controller 190 selects hosts 110 and resources 180 that will be used to satisfy the customer's request.

In step 208, operation controller 190 finds a path connecting a host 110 to a resource 180.

In step 212, operation controller 190, among the set of wavelengths supported by UDC 100, chooses an available wavelength that can be supported by the path to implement the connection. Operation controller 190, if necessary, re-assigns wavelengths.

In step 216, operation controller 190 programs the appropriate components of fabric 170, and thus together with the chosen wavelength forms a virtual wire. For example, operation controller 190 commands a multiplexer 130/a de-multiplexer 150 to aggregate/de-aggregate different wavelengths, commands switching fabric 140 to route the selected wavelengths, commands transponders 120 and 160 to convert the electrical signal to and from the corresponding wavelength, etc.

In step 220, operation controller 190 repeats steps 208 to 216 to establish all connections or virtual wires between the identified hosts 110 and resources 180, and the application can thus use these virtual wires to transfer data.

Adding a host 110 and/or a resource 180 to an existing system may invoke steps 202 to 220 in the above flowchart. Deprogramming transponder 120 to disallow the use of the selected wavelength removes the corresponding virtual wire or disconnects the corresponding host 110 and resource 180.

Steps for Selecting a Wavelength

Figure 2B:
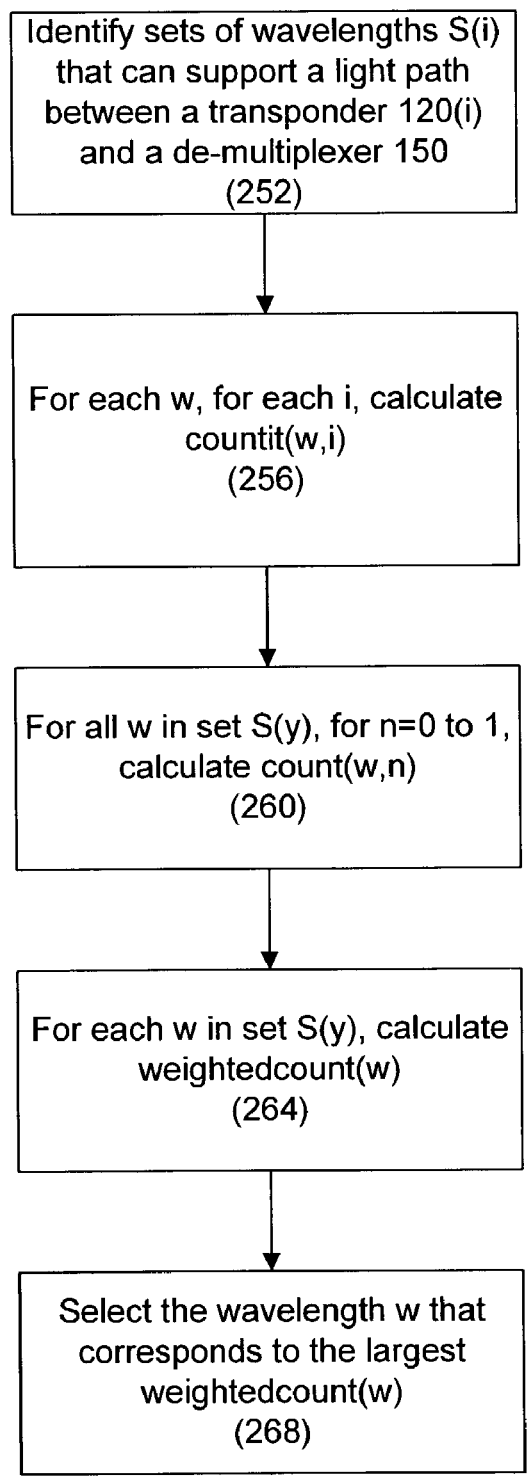
FIG. 2B is a flowchart illustrating the steps for selecting a wavelength for use in the flowchart of FIG. 2A, in accordance with one embodiment.

FIG. 2B is a flowchart 250 illustrating the steps in selecting a wavelength, e.g., for use in the example of FIG. 2A. A wavelength $w_{final}$ is finally selected for connectivity between a transponder 120(y) and a de-multiplexer 150(z). For illustration purposes, y equal 1. Since a host 110 and a resource 180 is appropriately connected to transponder 120(1) and de-multiplexer 150(z), respectively, wavelength $w_{final}$, once selected, provides connectivity between transponder 120(1) and de-multiplexer 150(z).

In step 252, for each transponder 120(i) in all transponders 120 in fabric 170, identify a set of wavelengths S(i) that is available within fabric 170 and that can support a light path between transponder 120(i) and de-multiplexer 150(z). Each set of wavelengths S(i) excludes wavelengths that are currently allocated for use within UDC 100 along the path between transponder 120(i) and de-multiplexer 150(z). For illustration purposes, sets of wavelengths S(1), S(2) and S(3) correspond to transponder 120(1), 120(2), and 120(3) and include wavelengths W(1)(1), W(1)(2); wavelengths W(2)(1), W(2)(2), W(2)(3); and wavelength W(3)(1), respectively. In this example, it is assumed that wavelengths W(1)(1), W(2)(1) and W(3)(1) are identical while wavelengths W(1)(2) and W(2)(2) are identical.

In step 256, for each wavelength w as supported by fabric 170, and each transponder 120(i), assign a first value 1 to countit(w,i) if, besides wavelength w, there is at least one other wavelength that can be used for a light path between transponder 120(*i*) and de-multiplexer 150(*z*), assign a second value 0 to countit(w,i) if wavelength w is the only wavelength that can be used for a light path between transponder 120(*i*) and de-multiplexer 150(*z*), and assign a third value −1 to countit(w,i) if wavelength w is not in the set of wavelengths S(i) or is not usable. The first value of 1 and the third value of −1 are used as an example only, different values are also efficient such as when the first value is equal to or greater than zero and the third value is less than zero.

In set S(1), for wavelength W(1)(1), countit(W(1)(1), 1) equals 1 because wavelength W(1)(2) can be used for a light path. For wavelength W(1)(2) countit(W(1)(2), 1) equals 1 because wavelength W(1)(1) can be used for a light path. For wavelength W(1)(3) not in set S(1), counit(W(1)(3), 1) equals −1 because wavelength W(1)(3) is not used in this example.

In set S(2), for wavelength W(2)(1), countit(W(2)(1), 2) equals 1 because wavelength W(2)(2) or W(2)(3) can be used for a light path. For wavelength W(2)(2), countit(W(2)(2), 2) equals 1 because wavelength W(2)(1) or W(2)(3) can be used for a light path. For wavelength W(2)(3), counit(W(2)(3), 2) equals 1 because wavelength W(2)(1) or W(2)(2) can be used for a light path.

In set S(3), for wavelength W(3)(1), countit(W(3)(1), 3) equals 0 because no other wavelength can be used for a light path. For wavelength W(3)(2) and W(3)(3), both countit(W(3)(2), 3) and countit(W(3)(3), 3) equal −1 because wavelength W(3)(2) or W(3)(3) are not usable.

In step 260, for all wavelengths w in set S(y), and for n=0 to first value, calculate count(w,n) as the number of transponders 120(*i*) when countit(w,i) equals to n, but i does not equal to y, which, in this example, is 1.

For all wavelengths in S(y) or S(1), count(W(*)(1), 0) equals 1, which is the number of transponders that have n=zero alternatives to wavelength W(*)(1), where * indicates the transponders 120(*i*) not including i equal to y; count(W(*)(1), 1) equal 1, which is the number of transponders that have at least n=one alternative to wavelength W(*)(1). Similarly, count(W(*)(2), 0) and count(W(*)(2), 1) equal 0 and 1, respectively.

In step 264, for each wavelength w in set S(y) or S(1), calculate weightedcount(w) that equals the sum of the product of count(w,n) and value n, for n=−1, 0, and 1 to first value.

Weightedcount(W(1)(1))=(count(W(1)(1),0)*(−1))+ (count(W(1)(1), 1)*1)=(−1)+1=0.

Weightedcount(W(1)(2))=(count(W(1)(2), 0)*(−1))+ (count(W(1)(2), 1)*1)=0+1=1.

In step 268, select the wavelength w that corresponds to the largest weightedcount(w) as the wavelength $w_{final}$ for use in connectivity between transponder 120(*i*) and de-multiplexer 150(*z*). In step 264, because W(1)(2) is associated with the largest weighted count of 1, W(1)(2) is selected as the wavelength $w_{final}$.

The above algorithm 250 helps to reduce contention for wavelengths. For example, if a wavelength w that corresponds to a smaller or the smallest weightedcount(w) is chosen as the wavelength $W_{final}$, then transponders 120 other than transponder 120(*y*) had fewer or no options other than that wavelength w for the light path between transponder 120(*y*) and de-multiplexer 150(*z*).

Steps Illustrating Operation of the Data Center

Figure 3:
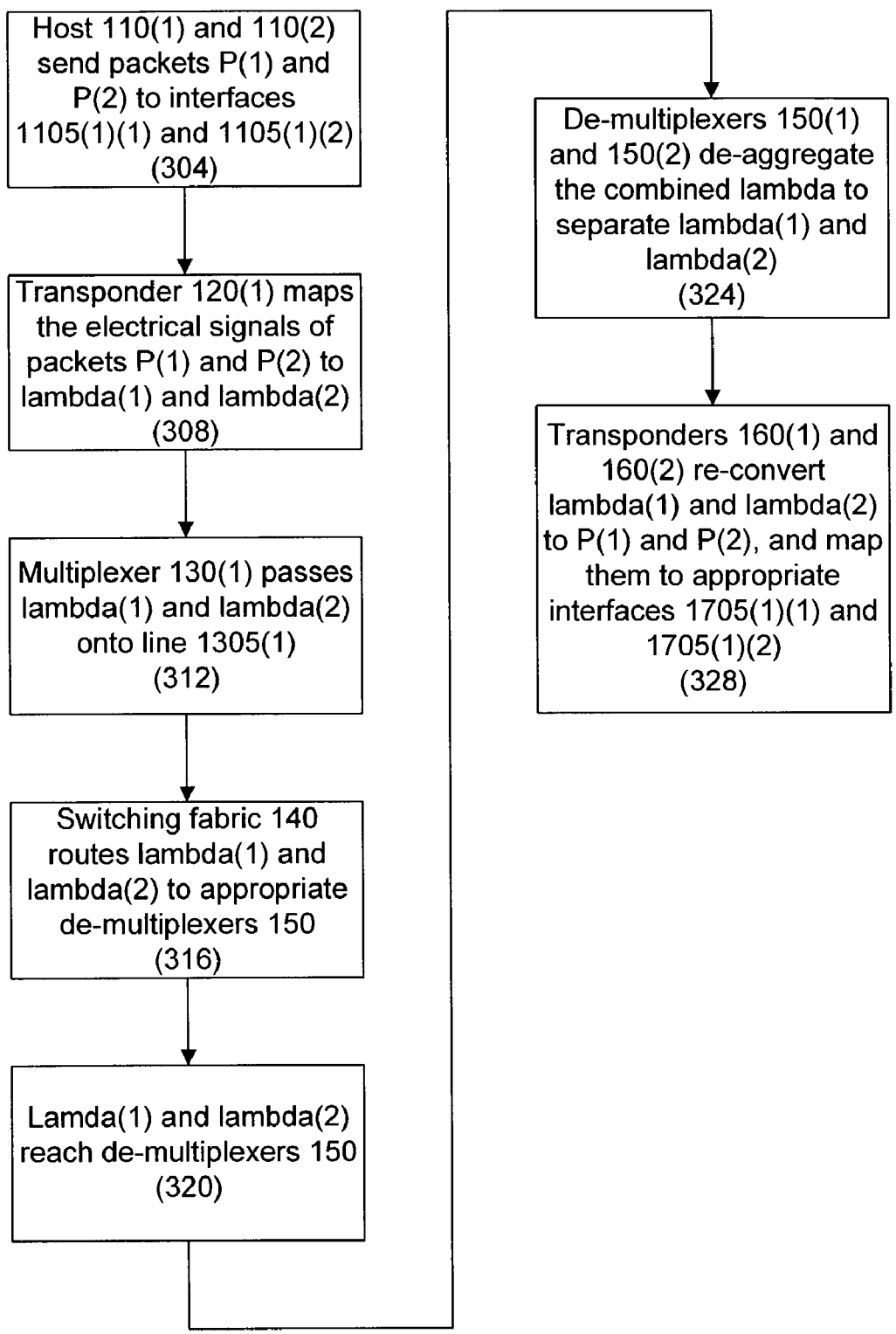
FIG. 3 is a flowchart illustrating the operational steps of a system created in FIG. 2A, in accordance with one embodiment.

FIG. 3 is a flowchart illustrating the operational steps of a system created in FIG. 2A, in accordance with one embodiment. In this example, two hosts 110(1) and 110(2) seek to send two packets P(1) and P(2) to two devices 180(1) and 180(2) connected to two interfaces 1705(1)(1) and 1705(2)(1), respectively.

In step 304, hosts 110(1) and 110(2) send packets P(1) and P(2) in the form of electrical signals onto appropriate interfaces, e.g., interfaces 1105(1)(1) and 1105(1)(2), respectively. For illustrative purposes, packet P(1) is an Ethernet packet, and packet P(2) is a Fiber channel packet. Consequently, interfaces 1105(1)(1) and 1105(1)(2) are the Ethernet and the Fiber channel interfaces, respectively.

In step 308, transponder 120(1) converts the electrical signal of packets P(1) and P(2) into light waves having wavelengths, e.g., lambda(1) and lambda(2) on line 1205(1)(1) and 1205(1)(2), respectively.

In step 312, multiplexer 130(1) passes lambda(1) and lambda(2) onto the fiber on line 1305(1). In various situations, multiplexer 130(1) may combine lambda(1) with lambda(2) and/or with other light waves represented by other lambdas.

In step 316, switching fabric 140, routes each lambda(1) and lambda(2) to an appropriate de-multiplexer 150 that is associated with the final destination of each lambda. For illustration purposes, switching fabric 140 routes lambda(1) to demultiplexer 150(1) and lambda(2) to de-multiplexer 150(2).

In step 320, lambda(1) arrives at de-multiplexer 150(1), and lambda(2) arrives at de-multiplexer 150(2). At this point, each lambda may have been combined with other lambdas.

In step 324, de-multiplexer 150(1) de-aggregates the combined light waves on line 1405(1) into separate light waves including lambda(1) on line 1505(1)(1). Similarly, de-multiplexer 150(2) de-aggregates the combined light waves on line 1405(2) into separate light waves including lambda(2) on line 1505(2)(1).

In step 328, transponders 160(1) and 160(2) convert lambda(1) and lambda(2) to electrical signals representing packets P(1) and P(2), respectively. Transponders 160(1) and 160(2) also maps packets P(1) and P(2) to appropriate interfaces 1705. That is, transponder 160(1) maps packets P(1) to an Ethernet interface, e.g., interface 1705(1)(1) connected to device 180(1) while transponder 160(2) maps packets P(2) to a Fiber channel interface, e.g., interface 1705(2)(1) connected to device 180(2). At this point, using fabric 170 as a connecting media, hosts 110(1) and 110(2) have successfully transmitted packets P(1) and P(2) to desired destination device 180(1) and 180(2).

Additional Explanation

In the above discussion, a host 110 may be considered a sender of data while a resource 180 may be considered a receiver of data. In that context, a resource 180 may be a sender sending data to a host 110 acting as a receiver. Consequently, in FIGS. 1A and 1B, a host 110 may be replaced by a resource, e.g., 180', and a resource 180 may be replaced by a host, e.g., 110'. Thus, data may be sent by a resource 180' to a host 110', through an interface 1105', a transponder 120', a line 1205', a multiplexer 130', a line 1305', switch 140', a line 1405', a de-multiplexer 150', a transponder 160', and an interface 1705' in which an interface 1105', a transponder 120', a line 1205', a multiplexer 130', a line 1305', switch 140', a line 1405', a de-multiplexer 150', a transponder 160', and an interface 1705' are comparable to an interface 1105, a transponder 120, a line 1205, a multiplexer 130, a line 1305, switch 140, a line 1405, a de-multiplexer 150, a transponder 160, and an interface 1705, respectively. In one embodiment, both sets of components 1105, 120, 130, 140, 150, 160, and 1705 and 1105', 120', 130', 140', 150', 160', and 1705' are used in programmable fabric 170 for hosts and resources to communicate with one another.

In an alternative embodiment, each component of programmable data center 100 and of programmable fabric 170 may function in both directions between hosts and resources. For example, a transponder 120 may convert electrical data on lines 1105 to wavelengths on lines 1205, and from wavelengths on line 1205 to electrical data on lines 1105. A transponder 160 may convert wavelengths on lines 1505 to electrical data on lines 1705, and from electrical data on lines 1705 to wavelengths on line 1505. A multiplexer 130 may multiplex wavelengths on lines 1205 to a line 1305, and de-multiplex the combined wavelength on a line 1305 to separate wavelengths on lines 1205. A de-multiplexer 150 may de-multiplex the combined wavelengths on a line 1405 to separate wavelengths on lines 1505, and multiplexes wavelengths on lines 1505 to a line 1405. Switching fabric 140 may route wavelengths on a line 1305 to a line 1405, and on a line 1405 to a line 1305, etc.

Computer System Overview

Figure 4:
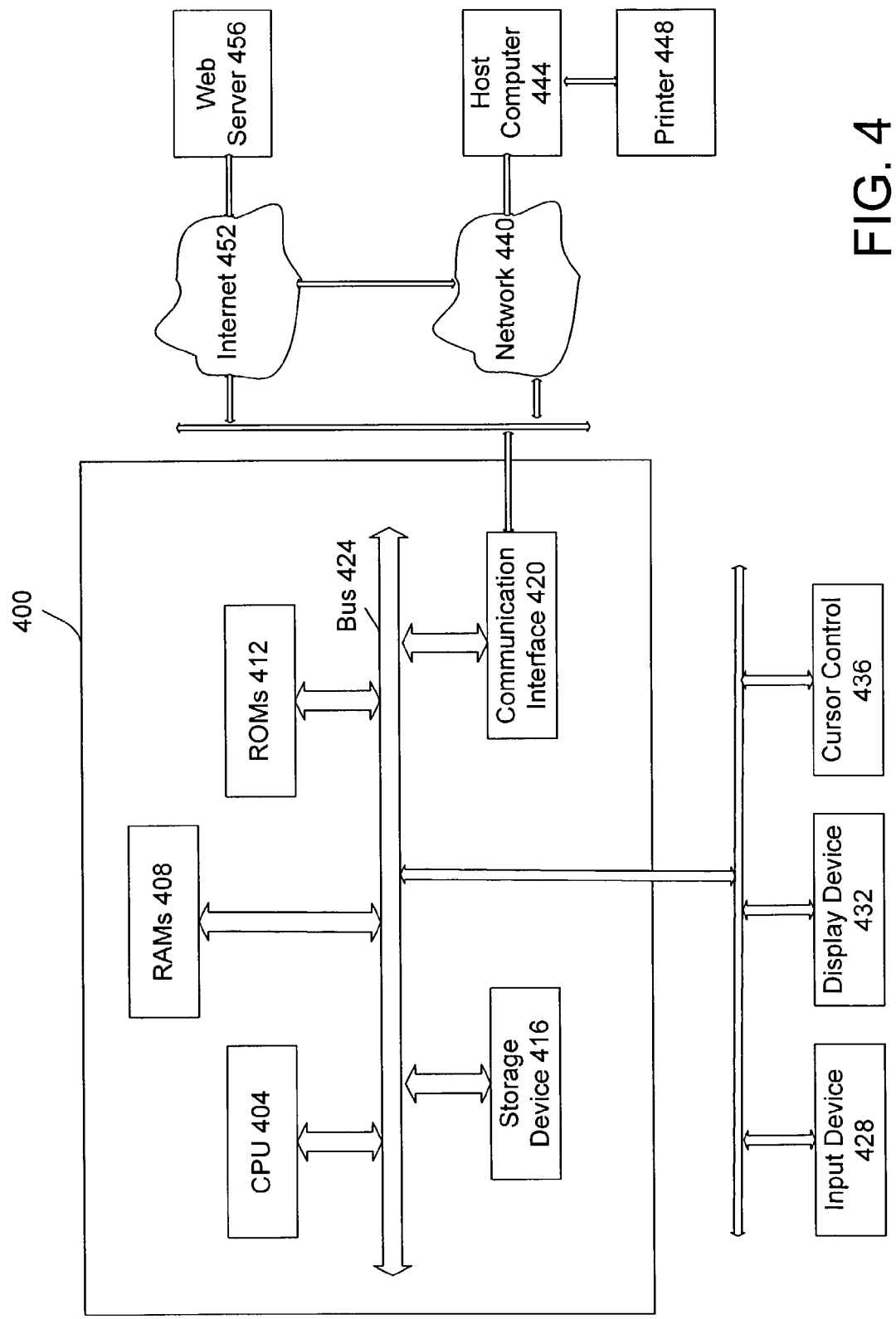
FIG. 4 shows a computer system upon which embodiments of the invention may be implemented.

FIG. 4 is a block diagram showing a computer system 400 upon which an embodiment of the invention may be implemented. For example, computer system 400 may be implemented to operate as a host 110, to perform functions in accordance with the techniques described above, etc. In one embodiment, computer system 400 includes a central processing unit (CPU) 404, random access memories (RAMs) 408, read-only memories (ROMs) 412, a storage device 416, and a communication interface 420, all of which are connected to a bus 424.

CPU 404 controls logic, processes information, and coordinates activities within computer system 400. In one embodiment, CPU 404 executes instructions stored in RAMs 408 and ROMs 412, by, for example, coordinating the movement of data from input device 428 to display device 432. CPU 404 may include one or a plurality of processors.

RAMs 408, usually being referred to as main memory, temporarily store information and instructions to be executed by CPU 404. Information in RAMs 408 may be obtained from input device 428 or generated by CPU 404 as part of the algorithmic processes required by the instructions that are executed by CPU 404.

ROMs 412 store information and instructions that, once written in a ROM chip, are read-only and are not modified or removed. In one embodiment, ROMs 412 store commands for configurations and initial operations of computer system 400.

Storage device 416, such as floppy disks, disk drives, or tape drives, durably stores information for use by computer system 400.

Communication interface 420 enables computer system 400 to interface with other computers or devices. Communication interface 420 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 420 may also allow wireless communications.

Bus 424 can be any communication mechanism for communicating information for use by computer system 400. In the example of FIG. 4, bus 424 is a media for transferring data between CPU 404, RAMs 408, ROMs 412, storage device 416, communication interface 420, etc. In one embodiment, bus 424 is implemented using optical fabric 170.

Computer system 400 is typically coupled to an input device 428, a display device 432, and a cursor control 436. Input device 428, such as a keyboard including alphanumeric and other keys, communicates information and commands to CPU 404. Display device 432, such as a cathode ray tube (CRT), displays information to users of computer system 400. Cursor control 436, such as a mouse, a trackball, or cursor direction keys, communicates direction information and commands to CPU 404 and controls cursor movement on display device 432.

Computer system 400 may communicate with other computers or devices through one or more networks. For example, computer system 400, using communication interface 420, communicates through a network 440 to another computer 444 connected to a printer 448, or through the world wide web 452 to a server 456. The world wide web 452 is commonly referred to as the "Internet." Alternatively, computer system 400 may access the Internet 452 via network 440.

Computer system 400 may be used to implement the techniques described above. In various embodiments, CPU 404 performs the steps of the techniques by executing instructions brought to RAMs 408. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 404 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 404 are in the form of one or more software programs and are initially stored in a CD-ROM being interfaced with computer system 400 via bus 424. Computer system 400 loads these instructions in RAMs 408, executes some instructions, and sends some instructions via communication interface 420, a modem, and a telephone line to a network, e.g. network 440, the Internet 452, etc. A remote computer, receiving data through a network cable, executes the received instructions and sends the data to computer system 400 to be stored in storage device 416.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for providing a programmable data center, comprising the steps of:
providing a plurality of computer systems;
providing a plurality of computing resources; and
providing a programmable fabric for creating connectivity between a set of computer systems and a set of computing resources; the set of computer systems being selected from the plurality of computer systems and the set of computing resources being selected from the plurality of computing resources;
wherein creating connectivity between a computer system and a computing resource comprises the steps of
converting data of the computer system from electrical form to a light wave represented by a wavelength, the data being carried by a communication protocol;
routing the light wave;
re-converting the light wave to the electrical form for use by the resource; and
selecting the wavelength from a set of available wavelengths, wherein the selected wavelength corresponds to a largest weighted value for connectivity between one of the computer systems and one of the computing resources, a weighted value being based on an availability of the selected wavelength to support the connectivity.

2. The method of claim 1 wherein an operation controller commands a first transponder to cause the converting step;
an optical switch to cause the routing step; and
a second transponder to cause the re-converting step.

3. The method of claim 1 wherein the light wave is identified as a first light wave, and the step of creating further comprises the steps of:
multiplexing the first light wave and a second light wave to form a multiplexed light wave,
routing the multiplexed light wave, and
de-multiplexing the multiplexed light wave.

4. The method of claim 1 wherein a computing resource of the plurality of computing resources is selected from a group consisting of Ethernet switches, Fiber channel switches, Infiniband switches, routers, storage arrays, firewalls, and load balancers.

5. The method of claim 1 wherein the communication protocol is selected from a group consisting of a plurality of communication protocols that can be converted to light waves.

6. The method of claim 1 wherein the communication protocol is selected from a group consisting of the Ethernet protocol, the Fiber channel protocol, the Infiniband protocol, and the serial cable protocol.

7. The method of claim 1 wherein an operation controller selects the set of computer systems and the set of computing resources based on information readable by the operation controller.

8. The method of claim 1 wherein an operation controller selects the wavelength representing the light wave if the wavelength is not in use by the programmable data center along a light path that is being established for the connectivity between the computer system and the computing resource.

9. The method of claim 1 wherein:
through components of the programmable fabric, there are a plurality of light paths for connecting the computer system and the computing resource; each light path corresponding to a weighted count; and
an operation controller selects the wavelength representing the light wave based on the weighted count.

10. The method of claim 1 wherein:
The wavelength is identified as the first wavelength and is being used by a first component;
an operation controller provides a second wavelength to replace the first wavelength to be used by the first component; and
the operation controller assigns the first wavelength to represent the light wave.

11. The method of claim 1 further comprising the step of disallowing the use of the wavelength to remove the connectivity.

12. A programmable data center, comprising:
a plurality of computer systems;
a plurality of computing resources; and
a programmable fabric including p2 a first transponder for converting data of a computer system from electrical form to a light wave represented by a wavelength; p2 the data being carried by a communication protocol; p2 a switching fabric for routing the light wave; and p2 a second transponder for re-converting the light wave to the electrical form for use by a resource; and
an operation controller for commanding p2 the first transponder to convert the data; p2 the switching fabric to route the light wave; and p2 the second transponder to re-convert the light wave, wherein the wavelength is selected from a plurality of available wavelengths, the selected wavelength corresponds to a largest weighted value for connectivity between one of the computer systems and one of the computing resources, a weighted value being based on an availability of the selected wavelength to support the connectivity.

13. The programmable data center of claim 12, wherein:
the light wave is identified as a first light wave;
the programmable fabric further comprising p2 a multiplexer for multiplexing the first light wave and a second light wave to form a multiplexed light wave; and p2 a de-multiplexer for de-multiplexing the multiplexed light wave; and
the switching fabric routes the multiplexed light wave before the multiplexed light wave is de-multiplexed.

14. The programmable data center of claim 12 wherein a computing resource of the plurality of computing resources is selected from a group consisting of Ethernet switches, Fiber channel switches, Infiniband switches, routers, storage arrays, firewalls, and load balancers.

15. The programmable data center of claim 12 wherein the communication protocol is selected from a group consisting of a plurality of communication protocols that can be converted to light waves.

16. The programmable data center of claim 12 wherein the communication protocol is selected from a group consisting of the Ethernet protocol, the Fiber channel protocol, the Infiniband protocol, and the serial cable data protocol.

17. The programmable data center of claim 12 wherein, to create a system from the programmable data center, the operation controller selects a set of computer systems and a set of computing resources based on information readable by the operation controller.

18. The programmable data center of claim 12 wherein the operation controller selects the wavelength representing the light wave if the wavelength is not in use by the programmable data center along a light path that is being established for the connectivity between the computer system and the computing resources.

19. The programmable data center of claim 12 wherein:
through components of the programmable fabric, there are a plurality of light paths for connecting a computer system of the plurality of computer systems and a computing resource of the plurality of computing resources; each light path corresponding to a weighted count; and the operation controller selects the wavelength representing the light wave based on the weighted count.

20. The programmable data center of claim 12 wherein:
the wavelength is identified as the first wavelength and is being used by a first system created from the programmable data center;
the operation controller provides a second wavelength to replace the first wavelength to be used by the first system; and
the operation controller assigns the first wavelength to represent the light wave.

21. The programmable data center of claim 12 wherein the operation controller disallows the use of the wavelength to remove connectivity between the computer system and the resource.

22. A method for selecting a first wavelength for connectivity between a first component of a plurality of first-type components and a second component in a data center, comprising the steps of:
for each component in the plurality of the first-type components, identifying a set of wavelengths that can support connectivity between the each component and the second component; the set of wavelengths corresponding to the first component being identified as the first set;
for each wavelength in each identified set of wavelengths corresponding to a component of the plurality of first-type components, corresponding the each wavelength to a first count; the first count being assigned a first value, if besides the each wavelength, there is at least one other wavelength in the each identified set of wavelengths that can support connectivity between the component and the second component; the first count being assigned a second value if the each wavelength is the only wavelength in the each identified set of wavelengths that can support the connectivity between the component and the second component; the first count is assigned a third value if the each wavelength in the each identified set of wavelengths is not usable;
for each wavelength in the first set, calculating a second count of the number of first-type components when the first count equals to the first value, and calculating a third count of the number of first-type components when the first count equals to the second value;
for each wavelength in the first set, corresponding the each wavelength in the first set to a weighted count; based on the second count and the third count; and
based on the correspondence between the each wavelength in the first set and the weighted count, identifying the first wavelength.

23. The method of claim 22 wherein a first-type component converts electrical data to wavelengths and the second component de-aggregates a combined wavelength to separate wavelengths.

24. The method of claim 22 wherein:
the first value equals to or greater than zero, the second value equals to zero, and the third value is less than zero;
a weighted count equals the sum of the product of the second count and the first value and the product of the third count and the second value; and
the first wavelength is identified when it corresponds to the largest weighted count.

25. A computer-readable medium for performing a method for selecting a first wavelength for connectivity between a first component of a plurality of first-type components and a second component in a data center, the method comprising the steps of:
for each component in the plurality of the first-type components, identifying a set of wavelengths that can support connectivity between the each component and the second component; the set of wavelengths corresponding to the first component being identified as the first set;
for each wavelength in each identified set of wavelengths corresponding to a component of the plurality of first-type components, corresponding the each wavelength to a first count; the first count being assigned a first value if, besides the each wavelength, there is at least one other wavelength in the each identified set of wavelengths that can support connectivity between the component and the second component; the first count being assigned a second value if the each wavelength is the only wavelength in the each identified set of wavelengths that can support the connectivity between the component and the second component; the first count is assigned a third value if the each wavelength in the each identified set of wavelengths is not usable;
for each wavelength in the first set, calculating a second count of the number of first-type components when the first count equals to the first value, and calculating a third count of the number of first-type components when the first count equals to the second value;
for each wavelength in the first set, corresponding the each wavelength in the first set to a weighted count; based on the second count and the third count; and
based on the correspondence between the each wavelength in the first set and the weighted count, identifying the first wavelength.

26. The computer-readable medium of claim 25 wherein a first-type component converts electrical data to wavelengths and the second component de-aggregates a combined wavelength to separate wavelengths.

27. The computer-readable medium of claim 25 wherein:
the first value equals to or greater than zero, the second value equals to zero, and the third value is less than zero;
a weighted count equals the sum of the product of the second count and the first value and the product of the third count and the third value; and
the first wavelength is identified when it corresponds to the largest weighted count.

* * * * *

UNITED STATES PATENT AND TRADEMARK OFFICE
CERTIFICATE OF CORRECTION

PATENT NO. : 7,266,598 B2
APPLICATION NO. : 10/278508
DATED : September 4, 2007
INVENTOR(S) : Jerome Rolia It is certified that error appears in the above-identified patent and that said Letters Patent is hereby corrected as shown below:

In column 5, line 2, delete "1" and insert -- I --, therefor.

In column 15, line 13, in Claim 1, after "of" insert -- : --.

In column 16, line 15, in Claim 12, after "including" delete "p2".

In column 16, line 17, in Claim 12, after "wavelength;" delete "p2".

In column 16, line 18, in Claim 12, after "protocol;" delete "p2".

In column 16, line 19, in Claim 12, after "and" delete "p2".

In column 16, line 22, in Claim 12, after "commanding" delete "p2".

In column 16, line 23, in Claim 12, after "data;" delete "p2".

In column 16, line 24, in Claim 12, after "and" delete "p2".

In column 16, line 34, in Claim 13, after "comprising" delete "p2".

In column 16, line 36, in Claim 13, after "and" delete "p2".

Signed and Sealed this

Tenth Day of August, 2010

David J. Kappos
*Director of the United States Patent and Trademark Office*